(12) United States Patent
You et al.

(10) Patent No.: US 7,562,572 B2
(45) Date of Patent: Jul. 21, 2009

(54) APPARATUS FOR MEASURING FORCE APPLIED BY THE HAND, ANALYZING APPARATUS, AND SYSTEM

(75) Inventors: Hee-cheon You, Pohang-si (KR); Sung-ha Park, Daejeon (KR); Sung-tae Kim, Pohang-si (KR); Gi-no Lee, Pohang-si (KR); O-chae Kwon, Pohang-si (KR); Young-kyun Kong, Jeollanam-do (KR); Ki-hyo Jung, Pohang-si (KR)

(73) Assignee: Postech Foundation, Pohang (KR)

( * ) Notice: Subject to any disclaimer, the term of this patent is extended or adjusted under 35 U.S.C. 154(b) by 0 days.

(21) Appl. No.: 11/667,896

(22) PCT Filed: Dec. 27, 2005

(86) PCT No.: PCT/KR2005/004562

§ 371 (c)(1),
(2), (4) Date: May 16, 2007

(87) PCT Pub. No.: WO2006/071043

PCT Pub. Date: Jul. 6, 2006

(65) Prior Publication Data

US 2007/0289379 A1 Dec. 20, 2007

(30) Foreign Application Priority Data

Dec. 29, 2004 (KR) ...................... 10-2004-0115527
Dec. 9, 2005 (KR) ...................... 10-2005-0120907

(51) Int. Cl.
*A63B 21/02* (2006.01)

(52) U.S. Cl. .................................................. 73/379.03
(58) Field of Classification Search .............. 73/379.01, 73/379.02, 379.03, 360, 760; 128/782, 774; 600/595; 702/41; 245/270, 266
See application file for complete search history.

(56) References Cited

U.S. PATENT DOCUMENTS

| 5,143,505 A | 9/1992 | Burdea |
| 5,317,916 A | 6/1994 | Kovacevic |
| 5,771,492 A | 6/1998 | Cozza |

(Continued)

FOREIGN PATENT DOCUMENTS

KR 20010003939 1/2001

(Continued)

OTHER PUBLICATIONS

International Search Report including Written Opinion of International Searching Authority (English) for PCT/KR2005/004562; mailing date: Mar. 29, 2006.

(Continued)

*Primary Examiner*—Jewel Thompson
(74) *Attorney, Agent, or Firm*—Marshall, Gerstein & Borun LLP

(57) ABSTRACT

Provided is an apparatus for measuring force applied to a hand when a worker works in an industrial field. The measuring apparatus includes a glove with a plurality of sensors on the palm side, a case with a band, and a register for receiving and registering measurement signals obtained in the sensors, the register being mounted in the case.

22 Claims, 18 Drawing Sheets

U.S. PATENT DOCUMENTS

| | | | |
|---|---|---|---|
| 5,785,666 A * | 7/1998 | Costello et al. | 600/595 |
| 6,016,103 A | 1/2000 | Leavitt | 340/575 |
| 6,452,584 B1 * | 9/2002 | Walker et al. | 345/158 |
| 6,681,638 B2 * | 1/2004 | Kazerooni et al. | 73/760 |
| 6,925,851 B2 | 8/2005 | Reinbold | |
| 2002/0178830 A1 | 12/2002 | Kazerooni et al. | 73/760 |
| 2003/0217582 A1 | 11/2003 | Reinbold et al. | 73/12.09 |
| 2006/0047447 A1 * | 3/2006 | Brady et al. | 702/41 |

FOREIGN PATENT DOCUMENTS

WO     WO 84/00064     1/1984

OTHER PUBLICATIONS

International Preliminary Examination Report on Patentability (English) for PCT/KR2005/004562; issue date: Jul. 3, 2007.

Supplementary European Search Report for Application No. 05822204.3-1236, date Jan. 17, 2008.

* cited by examiner

APPARATUS FOR MEASURING FORCE APPLIED BY THE HAND, ANALYZING APPARATUS, AND SYSTEM

TECHNICAL FIELD

The present invention relates to an apparatus for measuring force that a human hand applies to an object, an apparatus for analyzing data collected by the force measurement apparatus, and a system thereof.

BACKGROUND ART

Industrial fields are paying more attention to musculoskeletal disorder than ever to prevent accidents and work-induced diseases. Since workers working on the spot are exposed to various harmful factors according to each work environment, they are susceptible to the musculoskeletal disorder. Occupational factors that cause the musculoskeletal disorder are very diverse and, in most cases, the disease is developed by more than one harmful factors acting together. The musculoskeletal disorder is a chronic health problem in the musculoskeletal system which is caused by fatigue accumulated in muscle and bones. The accumulated fatigue injures the human body and develops pain and sensory dysfunction. The factors that cause the musculoskeletal disorder are uncomfortable work posture, excessive use of power, continued static state, lack of rest, excessive work repetition, limited work place, inappropriate work environment such as temperature, humidity, noise and lighting.

The development of musculoskeletal causes many social problems such as wage compensation cost, increasing medical expenses, deteriorating productivity and quality of living. Accordingly, the Ministry of Labor of the Republic of Korea has brought in force "Regulations on Industrial health standards" Amendment, whose selling point is that a business owner should investigate harmful factors on work which may induce musculoskeletal disorder one every three years, since Jul. 12, 2003, to prevent the musculoskeletal disorder.

As an increasing number of people are concerned with the musculoskeletal disorder, diverse forms of apparatuses are developed to measure force applied to a human body when a worker works. To take an example, Korean Patent Publication No. 10-2001-003939 discloses an apparatus for measuring a force that a human hand applies to a joystick by attaching a sensor to the joystick. U.S. Pat. No. 5,317,916 discloses an apparatus for measuring a force applied to two stick handles when a human being grabs the handles by setting up a sensor between the two stick handles.

The apparatuses of the cited references have limitation that they simply measure a grasping power, because workers cannot get the test while wearing the apparatuses in the hands and working. Therefore, there is a problem that it is hard to measure a physical force applied by a human body when a worker is exposed to diverse work environment.

DISCLOSURE

Technical Problem

It is an object of the present invention to easily measure a force applied by a hand of a worker in diverse work environments and analyze measured data in diverse forms.

Technical Solution

According to an aspect of the present invention, provided is a measuring apparatus, comprising a glove with a plurality of sensors on the palm side, a case with a band, and a register for receiving and registering measurement signals obtained in the sensors, the register being mounted in the case.

Herein, the sensors are mounted on at least one part of the palm side of the glove corresponding to a hand blade, finger bars connecting finger joints, and the finger joints connecting fingers to a palm.

Also, the sensors are Force Sensing Resistor (FSR) sensors that output different levels of voltage according to resistance values which are changed according to the force applied to the FSR sensors. Herein, the FSR sensors may be coated with epoxy resin, and they may be covered with a covering material.

The glove may further include a collecting member having a plurality of guide grooves for arranging signal lines connecting the sensors to the register in the back side of the glove. Wherein the palm side of the glove is formed of an outer shell having holes, an inner shell, and a space between the outer shell and the inner shell, and the sensors are set up at the holes and the signal lines are positioned in the space between the outer shell and the inner shell through the holes.

Also, the register includes an input unit for receiving signals from the sensors, a signal converting unit for converting the received signals into digital signals, and a control unit for storing the digital signals in a memory. Herein, the memory may be a small memory card such as a multi media card (MMC).

According to another aspect of the present invention, provided is a computation apparatus, comprising a processor and a memory. The processor converts measurement values of original data which are the measurement values registered in connection with time and channel into force values of a Newton unit and generates the original data into Newton data by using a computation method of a program stored in the memory.

The processor converts the measurement values of the original data into Newton data based on an equation expressed as $Y = a \times X$, where X denotes measurement value and a denotes a proportional constant defined as a ratio between a magnitude of known force and measurement value of the known force.

Also, the processor outputs a window displaying a left hand, a right hand, and horizontal bars shown on the hands.

Herein, the processor parses the Newton data according to sequence of time, identifies each horizontal bar with the channel of the Newton data, and highlights the force value in the form of a bar, and the processor makes the size of a highlighted bar differ according to the force value.

Also, the processor parses the Newton data, and forms and outputs histogram with the x axis showing force divided into sections for each force magnitude and the y axis showing a ratio (%).

Also, the processor parses the Newton data, and forms and outputs a waveform with the x axis showing time and the y axis showing force. Also, the processor forms two channel-based force values of the Newton data into waveforms, overlays the two waveforms, and outputs an overlay waveform window.

Also, the processor parses the Newton data, forms a time-based force value into a waveform for each channel, and outputs the waveform of each channel.

Also, the processor parses the Newton data and calculates a mean value, a standard deviation value, a minimum value, and a maximum value of the force value for each channel. The processor parses the Newton data, forms the force value according to time in the form of a waveform of each channel, and outputs a channel-based waveform window, and the processor deletes a dragged region of the waveform outputted onto the window from the Newton data or updates the Newton data with the Newton data of the dragged region.

Also, the processor smoothes the force value based on an equation expressed as $Y(n)=\{f(n)+f(n+1)+f(n+2)\}/3$, where $f(n)$ denotes an nth converted measurement value and n is a natural number.

According to another aspect of the present invention, provided is an analysis system, comprising: a measuring apparatus which includes a glove with a plurality of sensors on the palm side, a case with a band, and a register for registering measurement signals, which will be referred to as measurement value hereinafter, obtained in the sensors, relating the measurement values with time and channel for identifying each sensor, and registering the measurement signals in connection with time and channel as original data, the register being mounted in the case; and a computation apparatus which includes a processor and a memory, where the processor converts the measurement values of the original data into force values of a Newton unit and generates the original data into Newton data by using a computation method of a program stored in the memory.

BRIEF DESCRIPTION OF THE DRAWINGS

FIG. 15 statistically shows variation in a force applied to each part;

BEST MODE FOR THE INVENTION

Figure 1:
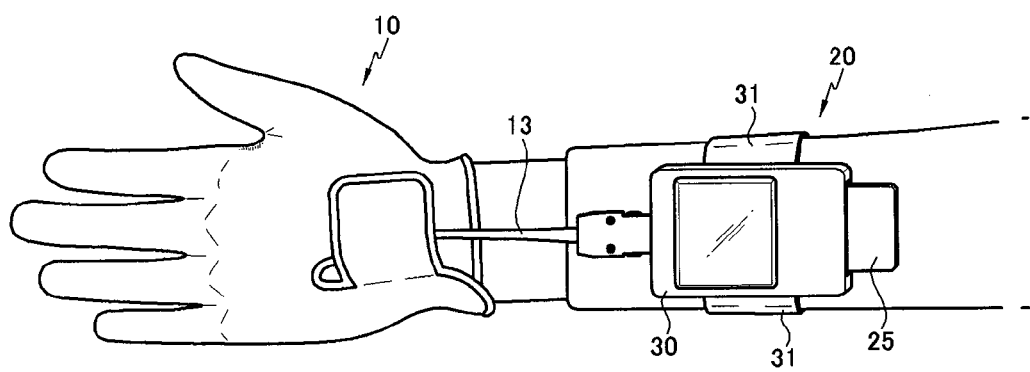
FIG. 1 shows a measuring apparatus in accordance with an embodiment of the present invention.

Hereinafter, embodiments of the present invention will be described in detail with reference to the accompanying drawings such that those skilled in the art can easily implement the present invention. The present invention, however, can be realized in diverse and different forms but the present invention is not limited to the embodiments presented in the present specification. FIG. 1 shows a measuring apparatus in accordance with an embodiment of the present invention;

This embodiment will be described with reference to FIG. 1, hereinafter. The measuring apparatus of the present embodiment comprises a glove 10 with a plurality of sensors 11 and a register 20 for registering the measurement result of the sensors 11.

Figure 2:
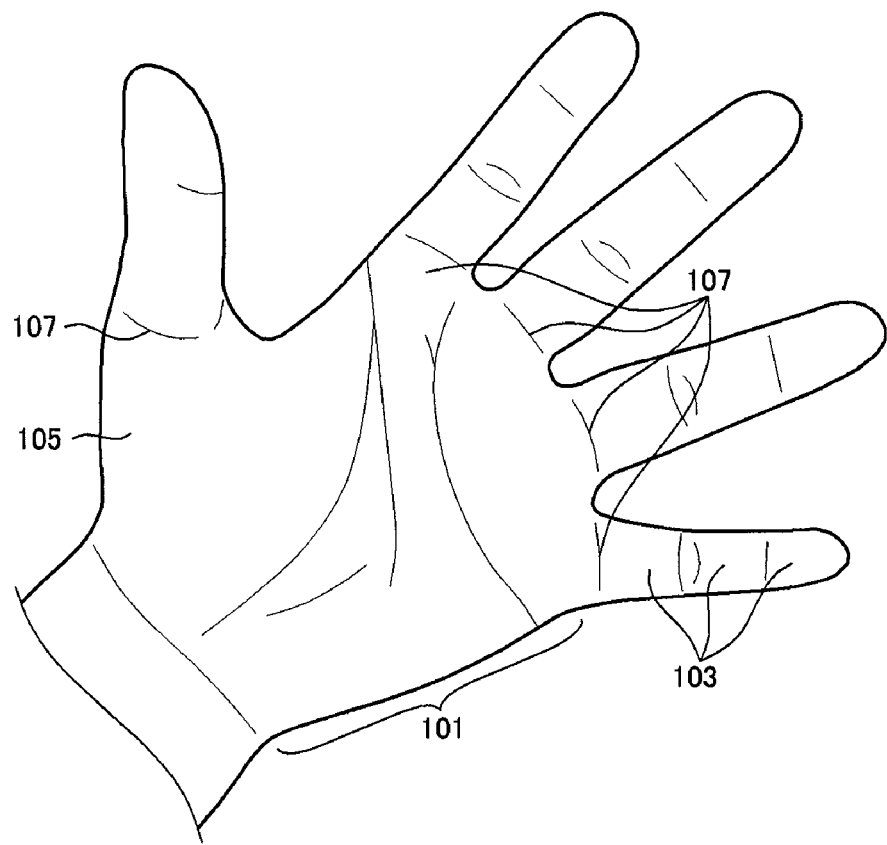
FIG. 2 is an illustration of a human hand.

The glove 10 includes the sensors 11 at the palm side 10a of the glove. The sensors 11 are disposed on the palm side along the part that contacts an object when a user grabs the object with a hand. The sensors will be described in detail with reference to FIG. 2, which shows an illustration of a human hand.

Usually, the back of a human hand is in the state of relaxation and the palm is constricted. In this state of a hand, when a person grabs an object, he moves fingers and grabs the object in the palm. Then, the object comes to contact the hand blade 101, finger bars 103 connecting the joints of each finger, and joints 107 connecting fingers to the palm. Also, a part 105 connecting the wrist with the thumb contacts the object, too.

In the present embodiment, the sensors 11 are mounted on the above-mentioned contact positions on the palm side 10a of the glove 10 along. The sensors 11 are mounted on each finger bar of five fingers, the hand blade, and the part connecting the wrist with the thumb on the palm side 10a of the glove 10 (see FIG. 3).

Meanwhile, in the present embodiment, the sensors 11 measure the force that a hand applies to an object when the hand touches the object. Herein, the sensors may be Force Sensing Resister (FSR) sensors. Herein, the present invention will be described by assuming that the sensors 11 are the FSR sensors but the invention is not limited to the use of FSR sensors.

The sensors 11 measure a force applied to each part of a hand by generating different levels of voltage upon resistance values, which are varied according to the force applied to the surface of the sensors 11. The sensors 11 may be coated with epoxy resin to increase a measurement accuracy, and it may be covered with a covering material to be protected from abrasion and damage. The covering material is embossed to prevent slipping in the surface.

Figure 4:
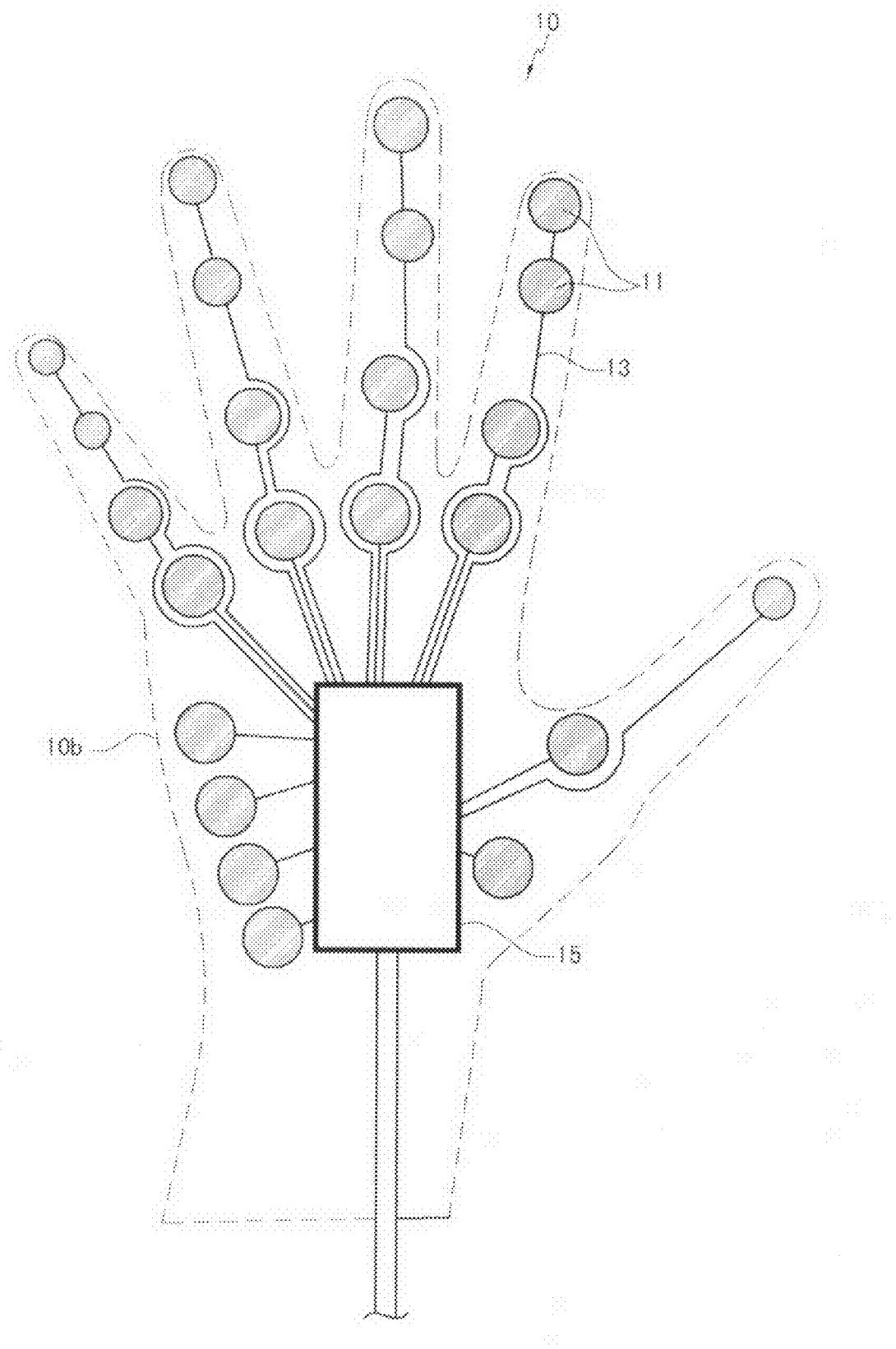
FIG. 4 shows wiring of signal line connecting the sensors disposed in the globe in accordance with an embodiment of the present invention.

Meanwhile, as shown in FIG. 4, the sensors 11 on the palm side 10a of the glove 10 are connected to a register 20 through signal lines 13. The glove 10 may further include a collection member 15 for arranging the signal lines 13 not to bother the motion of the hand.

According to an example of the present invention, the collection member 15 includes a plurality of guide grooves mounted on a plate. The signal lines 13 withdrawn from the sensors 11 are collected in the collection member 15 and housed in the guide groove of the collection member 15. The signal lines 13 are collected in the collection member and connected to the register 20. It is obvious to those skilled in the art that the collection member 15 for arranging the signal lines 13 is not limited to what is described in the above but it can be formed in various shape. The collection member 15 may be mounted on the back side 10b of a glove 10 not to bother the motion of the hand.

Figure 3:
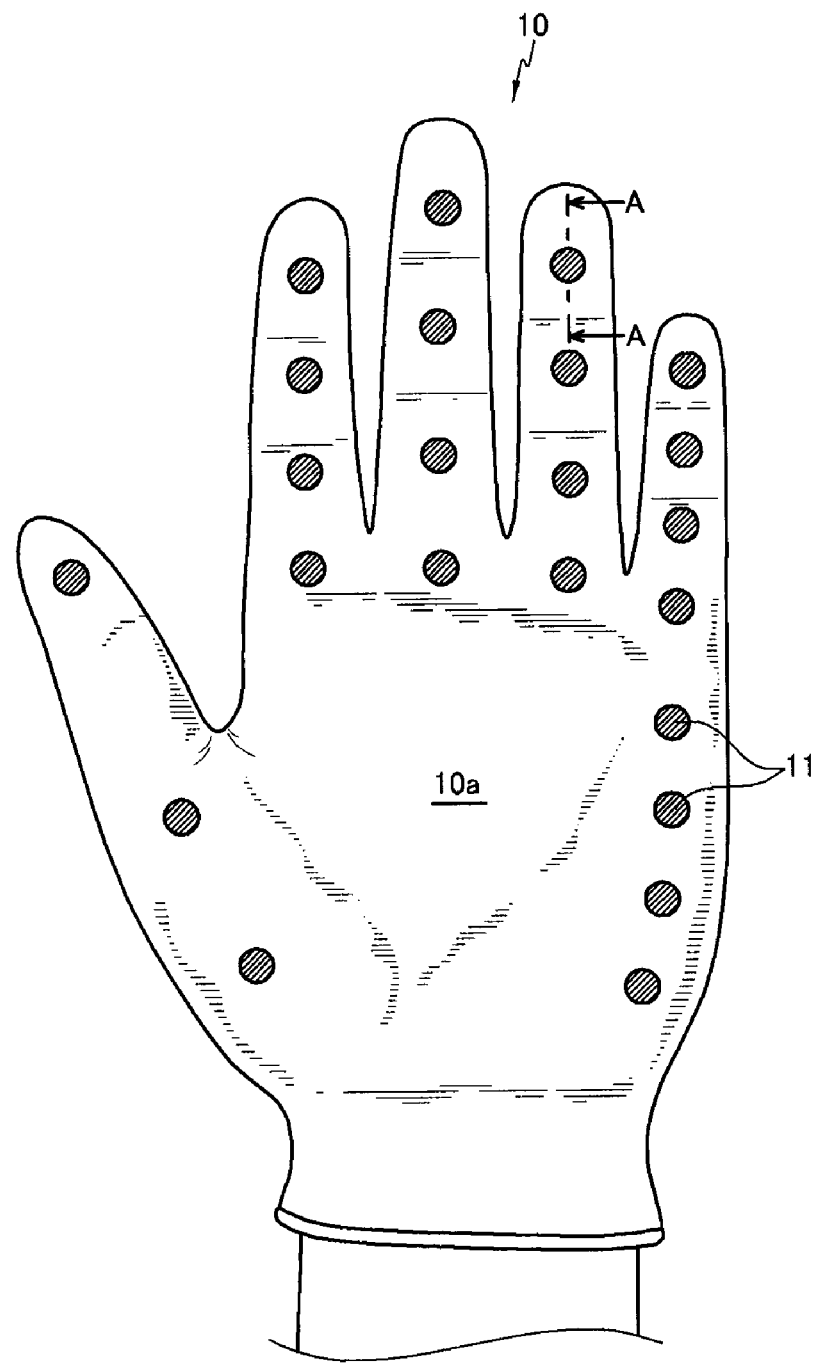
FIG. 3 shows the location of sensors disposed at the palm side of a glove in accordance with an embodiment of the present invention.
Figure 5:
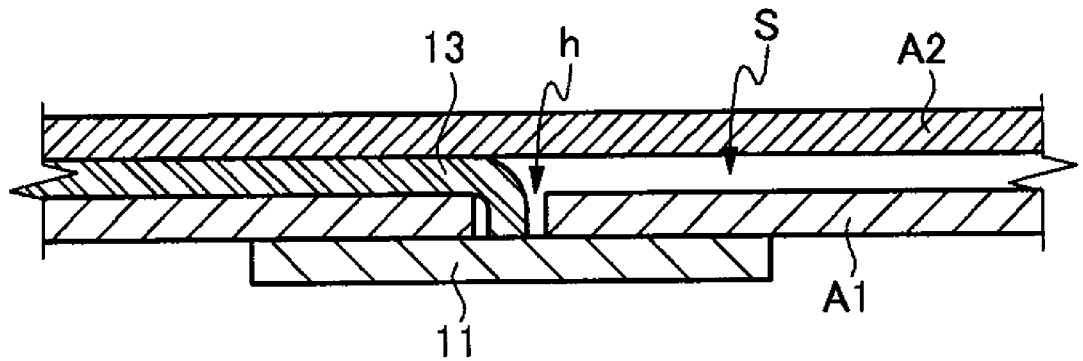
FIG. 5 shows a cross section obtained by cutting the glove of FIG. 3 along a line A-A.

Referring to FIG. 5, which shows a cross section of the palm side obtained by cutting the glove of FIG. 3 along a line A-A, the structure of the palm side of the glove will be described in detail, hereinafter.

The palm side 10a of the glove 10 is formed in a dual structure of an inner shell A2 and an outer shell A1 and the signal lines 13 are positioned in a space (S) between the inner shell A2 and an outer shell A1. To be specific, the outer shell A1 includes holes (h) and the FSR sensors 11 are set up in the outside of the outer shell A1 at the holes (h). The signal lines 13 connected to the FSR sensors 11 are positioned in the inner surface of the outer shell A1 through the holes (h), that is, the space (S) formed between the outer shell A1 and the inner shell A2. Since the signal lines 13 are covered with the outer shell A1, they can be protected from an external force. Also, as the signal lines do not come out of the glove, they do not spoil the appearance of the glove and do not interfere the work of a worker wearing the glove.

Figure 6:
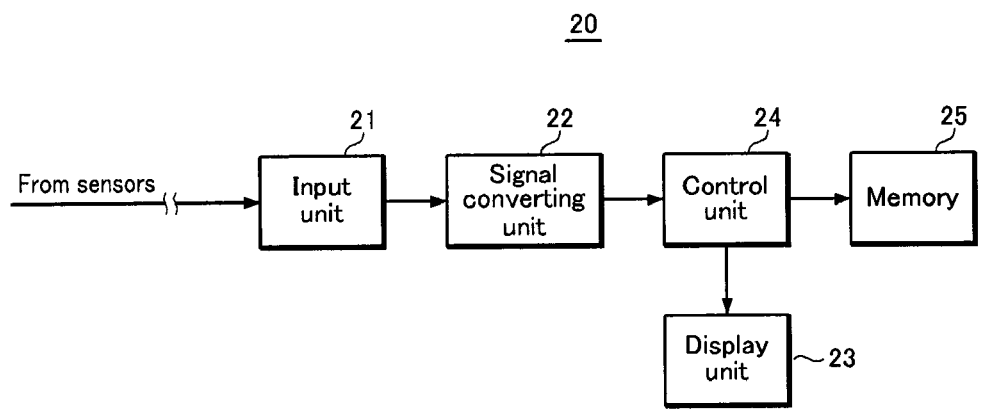
FIG. 6 is a block diagram showing the structure of a register in accordance with an embodiment of the present invention.

In the present embodiment, the register 20 receives measurement signals obtained in the sensors 11 through the signal lines 13 and stores them in the form of a binary file in a memory 25. FIG. 6 is a block diagram showing the structure of the register 20 in accordance with an embodiment of the present invention. The register 20 will be described more in detail with reference to FIG. 6.

The register 20 includes an input unit 21 for receiving signals, a signal converting unit 22 for converting the received signals into digital signals, a display unit 23 for displaying the state of operation, a control unit 24 for controlling the operation state of each unit, and a memory 25 for storing data. The constituent elements are connected with each other through a serial peripheral interface (SPI).

The memory 25 is formed of a small attachable/detachable memory card such as a multimedia card (MMC) and a secure digital card (SDC), and the control unit 24 is formed of a microprocessor such as Atmega128 to control the constituent elements.

The register 20 of the above-described structure receives measurement signals obtained from the sensors 11 in the input unit 21, amplifies them in an amplifying unit (not shown) into signals having a predetermined amplitude, and transmits the amplified signals to the signal converting unit 22. The signal converting unit 22 converts the amplified signals into digital signals and stores the digital signals in the memory 25 in the format of a binary file according to the control of the control unit 24.

The register 20 is substantially realized by a plurality of circuit devices mounted on a printed circuit board. The printed circuit board is mounted in a case 30 having a housing space inside.

A pair of loops are mounted on the case 30 and each of the loops are provided with an elastic band 31 or a band 31 with Velcro tape.

Figure 7:
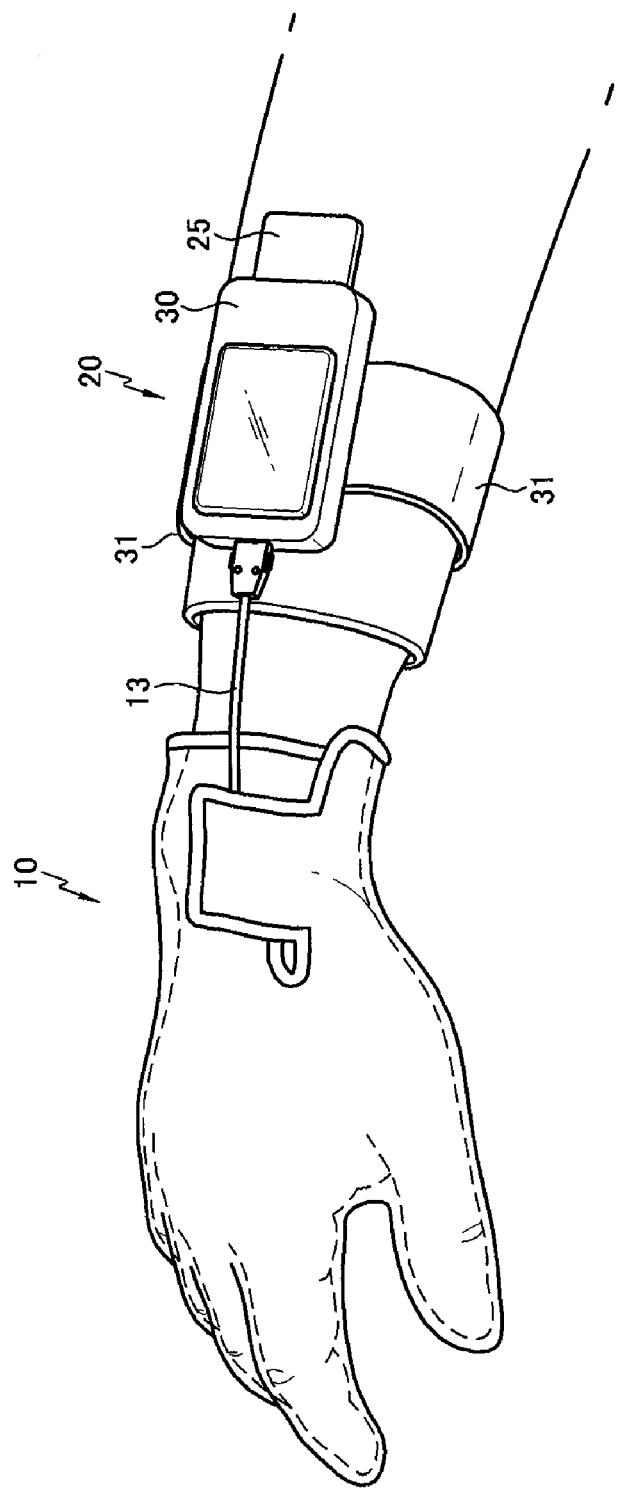
FIG. 7 shows an illustration when a worker wears the measuring apparatus.

Accordingly, the work wears the glove 10 in the hand and fixes the register 20 in the wrist by using the band 31. In this way, the worker in an industrial field can have the register 20 fixed in the wrist while wearing the glove 10 in the hand and thus he can carry the measuring apparatus all the time during the working hours. The worker works with the measuring apparatus suggested in the present embodiment attached to his body, and data collected from each part of the hand through the sensors 11 of the glove 10 are transmitted to the register 20 through the signal lines 13. The signals are processed in the register 20 and stored in the memory 25 (see FIG. 7).

Figure 8:
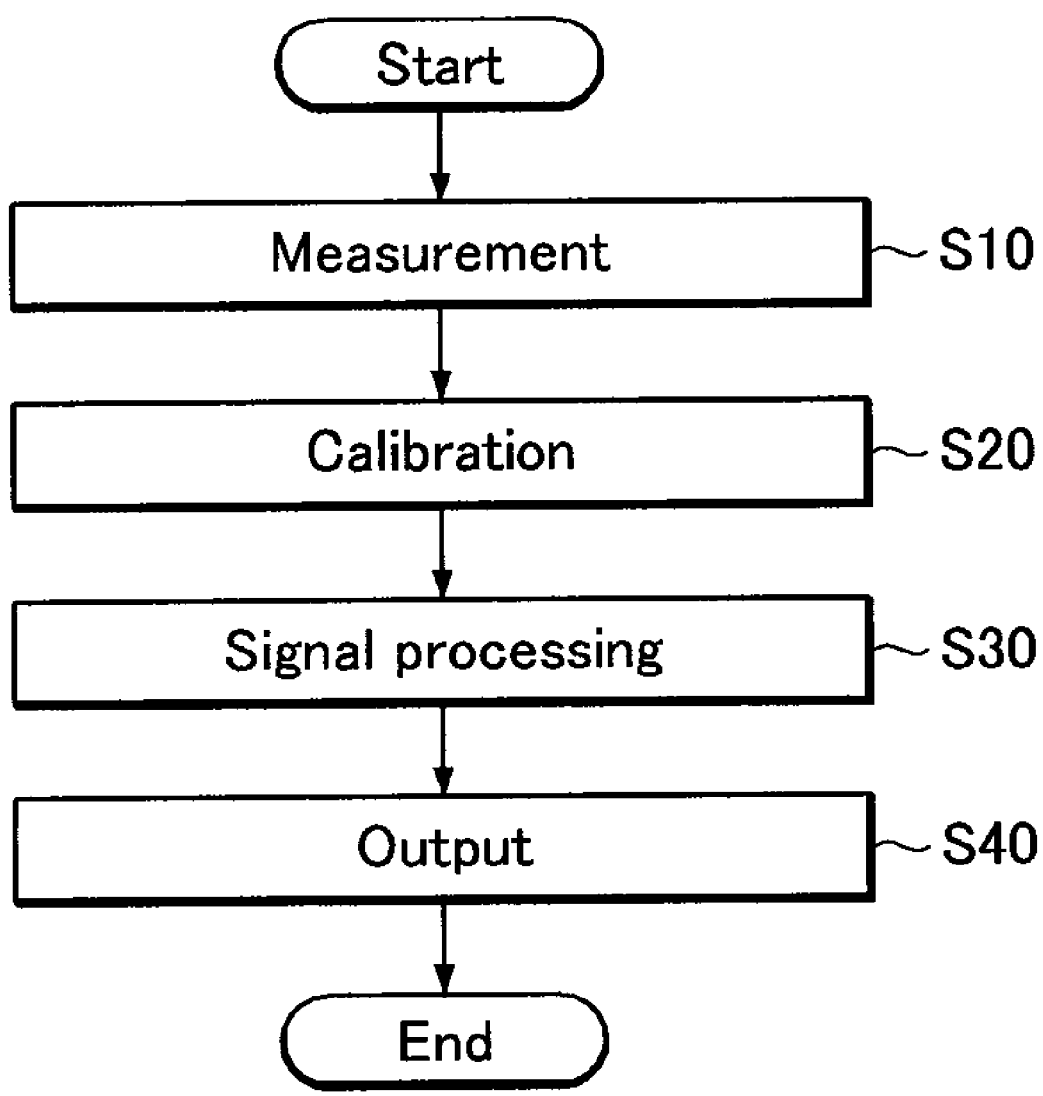
FIG. 8 is a flowchart describing the entire analysis process in accordance with an embodiment of the present invention.

Hereinafter, an analysis of the collected data will be described in detail. The analysis method suggested in the present invention is programmed and set up as a program in a computation device. Herein, the computation device includes a processor capable of performing logical operations and a memory, and it may be a computer. FIG. 8 is a flowchart describing the entire computation process in accordance with an embodiment of the present invention;

The computation process comprises a measurement step (S10), a calibration step (S20), a signal processing step (S30) and an output step (S40).

First, in step S10, data on the force applied by a worker are acquired from the glove 10 and the register 20. In the step S10, the worker wears the glove and the register in the hand and the wrist, respectively, while working. The data on the force applied by the hand of the worker are registered and stored in the memory 25 of the register 20. The register 20 registers time and measurement values in the memory 25 in the format of a binary file. The registered file is transmitted to a computer through a Universal Serial Bus (USB) connector.

In step S20, the measurement values obtained in the sensors 11 are converted based on a calibration function. Through the process, the measurement values are converted into values of a Newton (N) unit. That is, the converted values, i.e., the Newton values, are acquired by inputting the measurement values obtained by applying physical force that we know to the sensors 11 to a proportional equation. Since the signals obtained in the sensors 11 are converted in proportion to the magnitude of the physical force through the process, there is an advantage that it is easy to figure out how much force the worker uses for work.

In step S30, data are pre-processed to obtain information of high accuracy prior to detailed analysis. The step S20 is performed optionally. It is performed when data include noise or there are data other than target data to be analyzed. Among the measured data, those unnecessary for the analysis are removed optionally by using an editing function. When the data include noise, the noise is removed optionally from the data by using filtering and smoothing functions.

In step S40, the measurement values are visually outputted onto a screen through graphical and statistical analysis. The visual analysis provided in the step S40 includes an overlay waveform, a hand map meter, and histogram.

Figure 9:
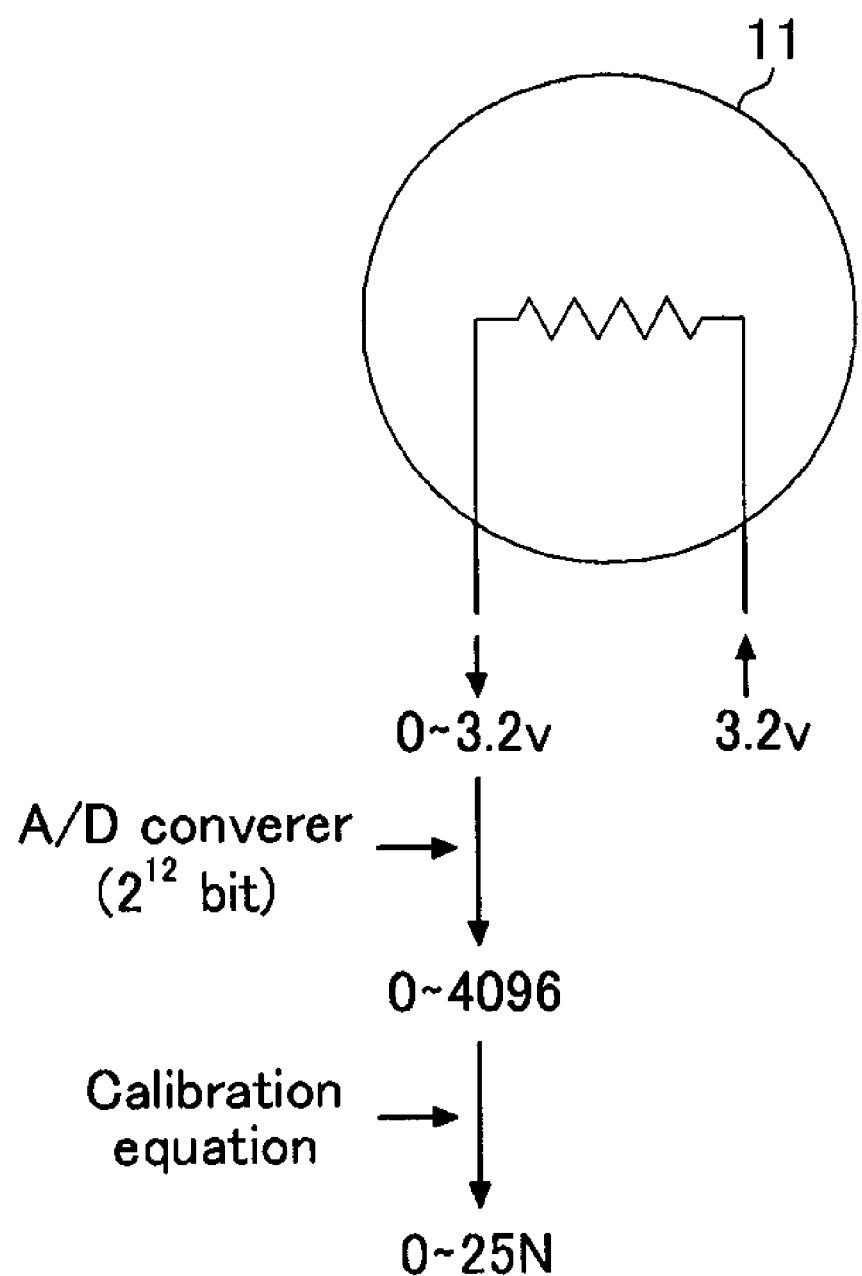
FIG. 9 shows a process of converting a measurement value detected in the sensors of the glove into a force value.

FIG. 9 shows a process of converting a measurement value obtained in the sensors 11 of the glove 10 into a force value.

Prior to the conversion, the memory 25 of the register 20 is connected to a computer to load the data registered in the memory 25. Since the data reading is performed in a well-known method, detailed description on it will not be provided herein.

The computer reads the data from the memory 25 and stores them in a volatile memory such as a Random Access Memory (RAM). The data registered in the memory 25 are data on the force applied to the hand according to time, and they are obtained by converting the amplitude of voltage variation in the FSR sensors simply into digital signals and the registered. The data will be referred to as original data, hereinafter.

Herein, the original data are registered in the memory 25 of the register 20. When voltage of 3.2V is applied to the FSR sensors 11, the force applied to the sensors 11 acts as resistance. Thus, voltage of 0 to 3.2V is outputted in inverse proportion to the magnitude of the force. The output voltage is converted into digital signals in the signal converting unit 22 and registered as original data of a file format in the memory 25.

The computer applies a calibration function registered in a program to the original data to thereby convert them into a force value. The calibration function is defined as follows. For example, when artificial forces of 0 and 5 N are applied to the sensors 11 of the glove 10 sequentially to thereby obtain output signals of 0 and 1,000, the calibration function is defined as $Y=0.005 \times X$ from the relationship between the forces and output signals. Therefore, when the output signal is 500, the result obtained from the calibration function is 2.5N.

The computer converts the data by applying the calibration function which is defined as a proportional relationship between the known magnitude of force and the output signal of the sensors 11 to the original data, and then it registers the converted data, which will be referred to as Newton data hereinafter, in a volatile memory.

As described above, the computer generates the Newton data through the original data reading and the calibration process, which are performed simultaneously, processes the Newton data according to each request, and outputs a result suitable for the request onto a screen.

Figure 10:
FIG. 10 shows a main window outputted when the analysis method is realized as a program.

FIG. 10 shows a main window outputted when the program registered in the computer is executed.

The above-described calibration process of the original data is carried out while a file tap 101 is selected in the main window 100 and the original data registered in a file format is read out of the memory.

As described above, the Newton data are loaded on the volatile memory through the conversion of the Newton data, and the results obtained by selecting the buttons 103 of the main window are displayed on the screen of a monitor.

Figure 11:
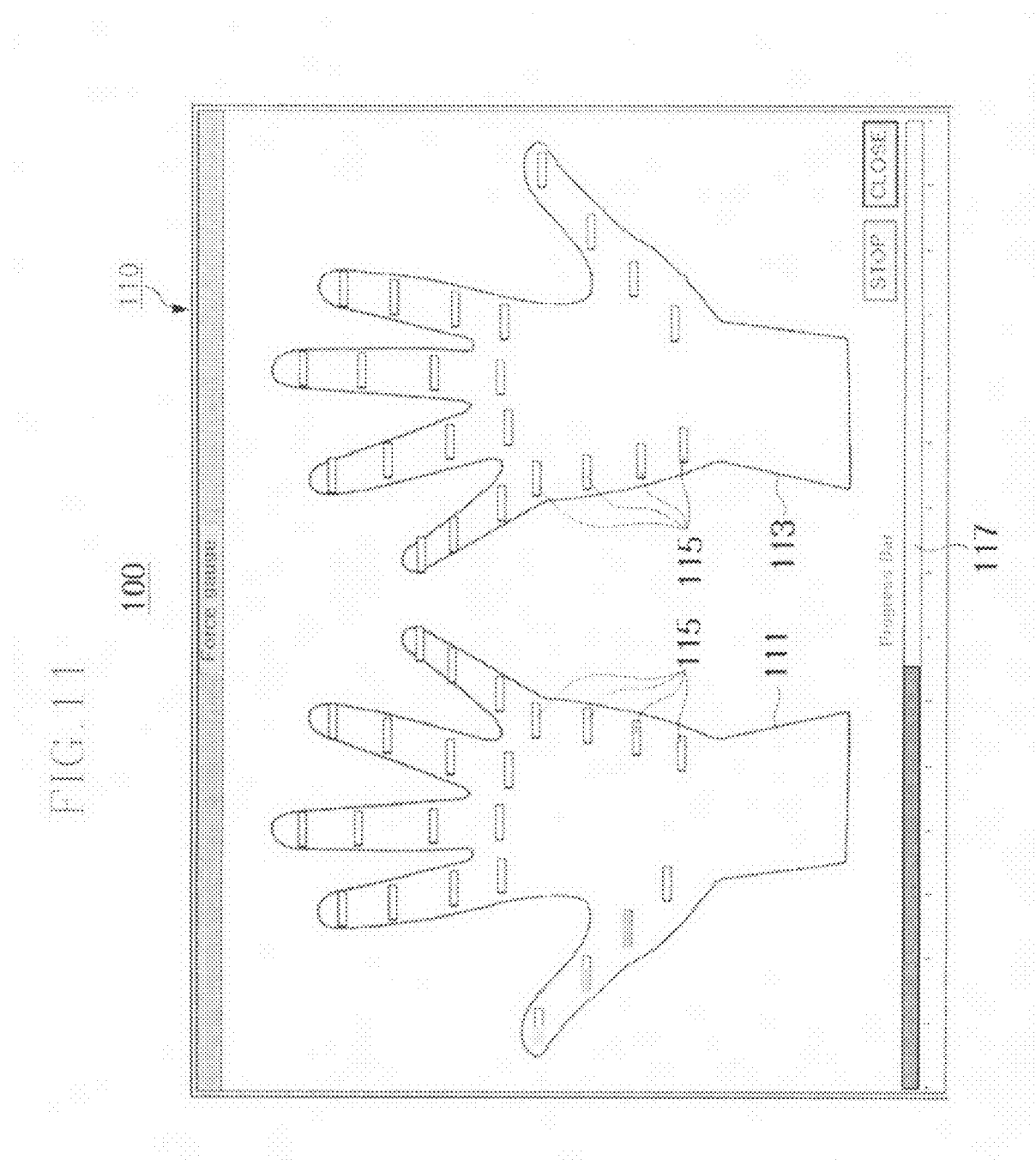
FIG. 11 presents a window showing a hand map meter.

FIG. 11 presents a window showing a hand map meter. The window 110 includes a left hand 111, a right hand 113, and horizontal bars 115 displayed on the left and right hands. Herein, the horizontal bars 115 are positioned in the same location as the sensors 11 are set up in the glove 10. Also, a process bar 117 is shown in the lower part of the window 110.

The window 110 displays the magnitude of the force applied to each part of the hand according to time. The process bar 117 shows the flow of time and the horizontal bars 115 shows the magnitude of force applied to each location at the time.

Figure 12:
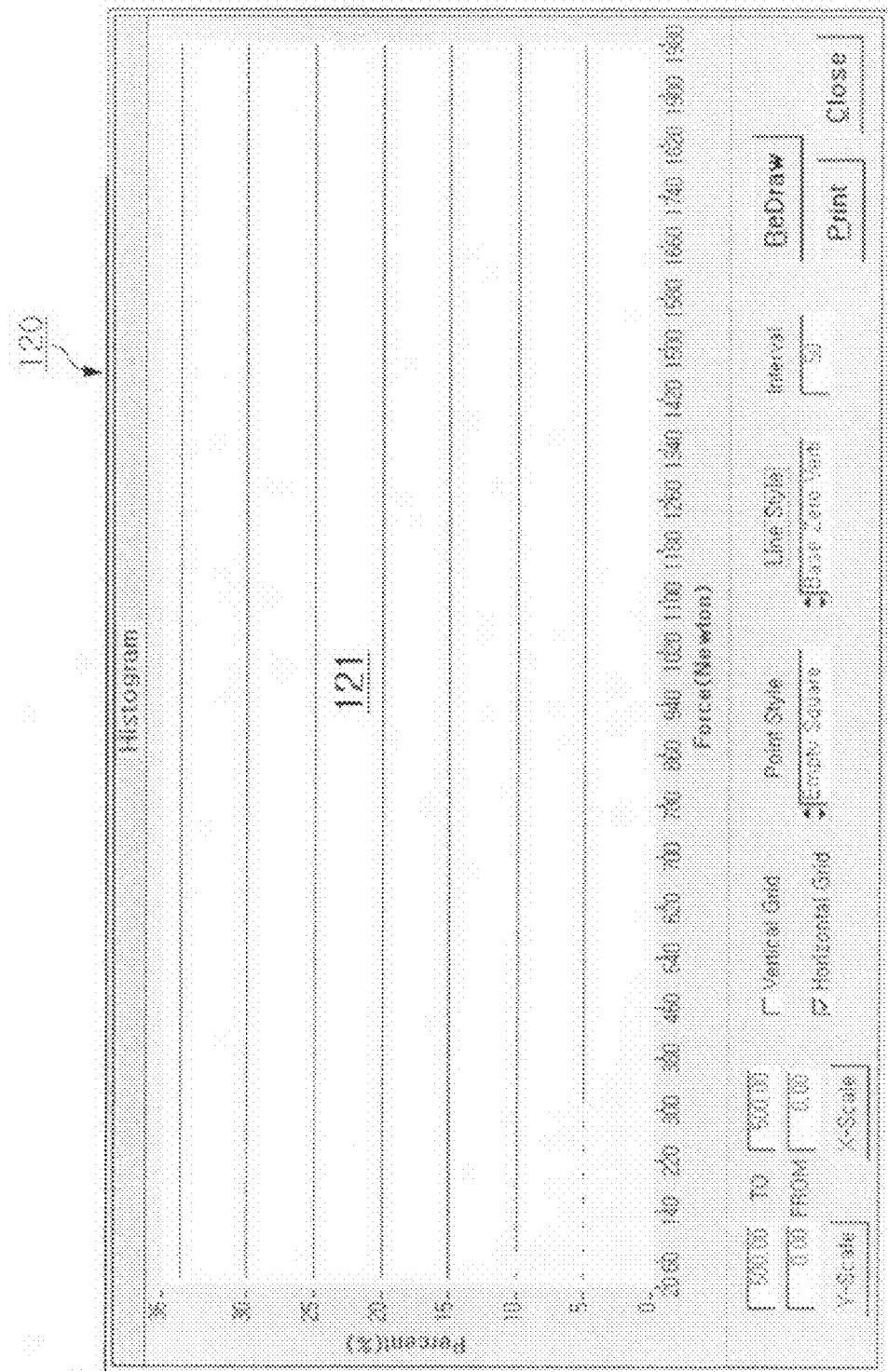
FIG. 12 shows a histogram window.

The computer highlights the horizontal bars 115 based on the Newton data registered in connection with time. The computer parses the Newton data according to time and channel. Herein, the channel is a code for identifying the sensors 11. The computer highlights each horizontal bar 115 in the shape of a bar according to the sequence of time. Herein, a horizontal bar 115 desired to be displayed is selected with reference to the channel. Also, the size of the highlight bar displayed in the horizontal bars 115 is determined based on a rule. The size of the highlighted bar is determined in proportion to the magnitude of force based on a predetermined rule. For example, force 1N is displayed in 1 mm and force of 2N is displayed in 2 mm. Therefore, an operator can monitor the force using pattern of the work on a time basis by watching the horizontal bars 115 highlighted in the window 110. FIG. 12 presents a histogram window. A window 120 shows histogram 121 with the x axis showing force and the y axis showing frequency (%). Herein, the x axis divides the force into predetermined sections and the y axis shows frequency in each section. The computer optionally outputs the data of a selected sensor 11 in the form of histogram, which is shown in FIG. 12.

The operator can select any one of the sensors 11 by selecting a button executing the histogram among the buttons 103 of the main window 100. Also, the operator can choose the width of the force section in the x axis. FIG. 12 shows an example where the width is 80.

Then, the computer forms the histogram 121 by optionally extracting data of a sensor 11 selected by the operator, when it parses the Newton data loaded on the volatile memory.

Herein, the computer forms the histogram such that the histogram of each section is suitable to the size of the frequency in the y axis according to a statistical computation method. In short, the computer calculates extracts the magnitude of force of each section from the Newton data to thereby obtain a ratio and determines the size of histogram based on the y axis.

When the operator changes the frequency section of the x axis, it displays the x axis with the changed frequency section and forms the histogram proper to the frequency section in the statistical computation method.

The output of the histogram makes the operator easily figure out how frequently the force is applied in each section with respect to each sensor.

Figure 13:
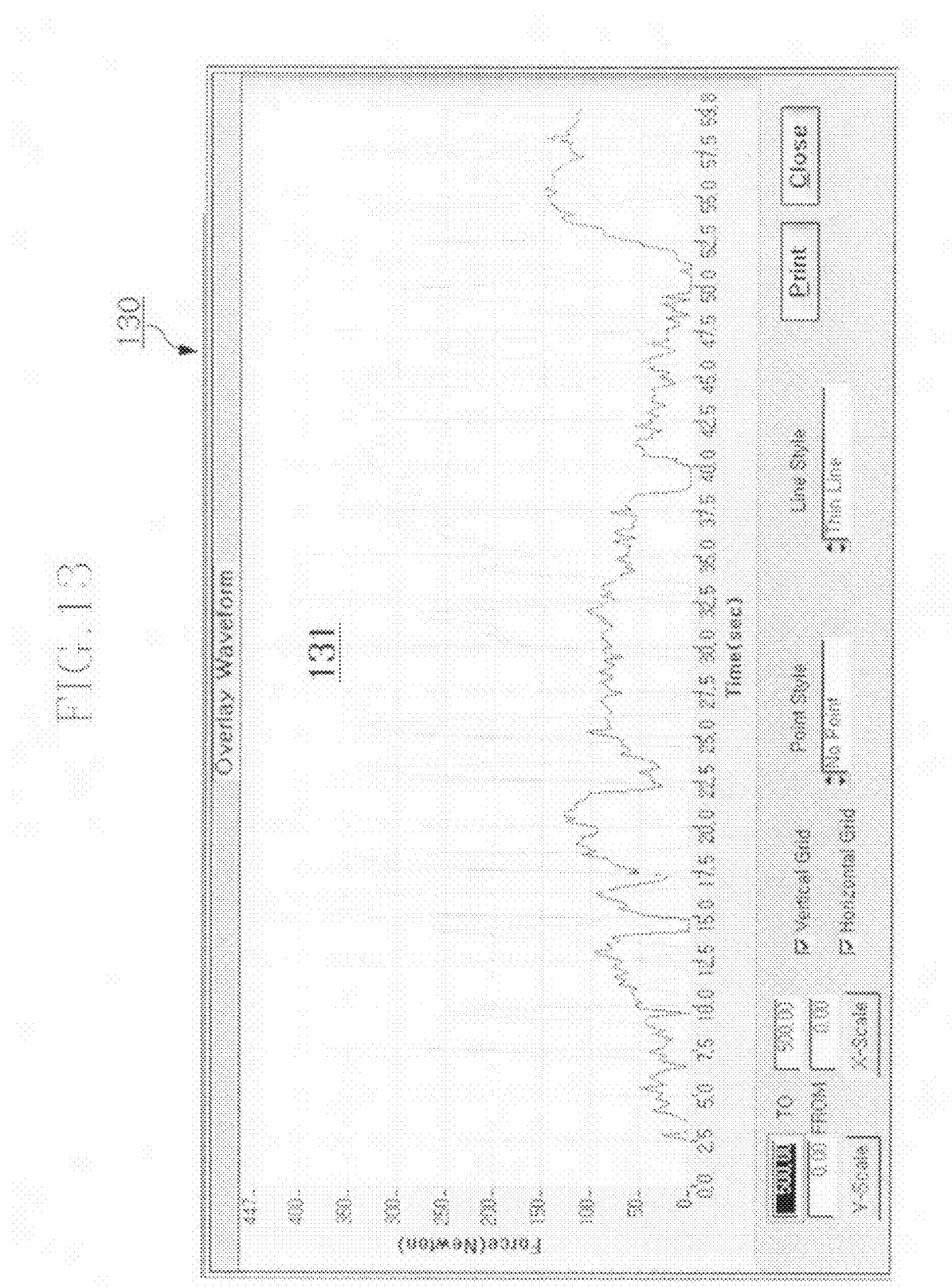
FIG. 13 is an overlay waveform window.

FIG. 13 shows an overlay waveform window to compare the magnitude of force of two sensors according to time.

The window 130 includes a waveform 131 with the x axis showing time and the y axis showing force. The computer outputs the data of a first sensor and a second sensor which are selected by the operator in the form of overlay waveform, which is shown in FIG. 13 and compares the data of the two selected sensors. Therefore, the operator can compare the distribution of force applied to each desired part of the hand according to time.

The operator selects a button for executing the overlay waveform in the buttons 103 of the main window 100 and selects two sensors 11.

Then, the computer optionally extracts data of the sensors selected by the operator among the Newton data registered in the volatile memory with reference to the channel, forms waveform for each sensor with reference to the time and channel in connection with the extracted data, and displays the waveforms 131 in the window 130.

Figure 14:
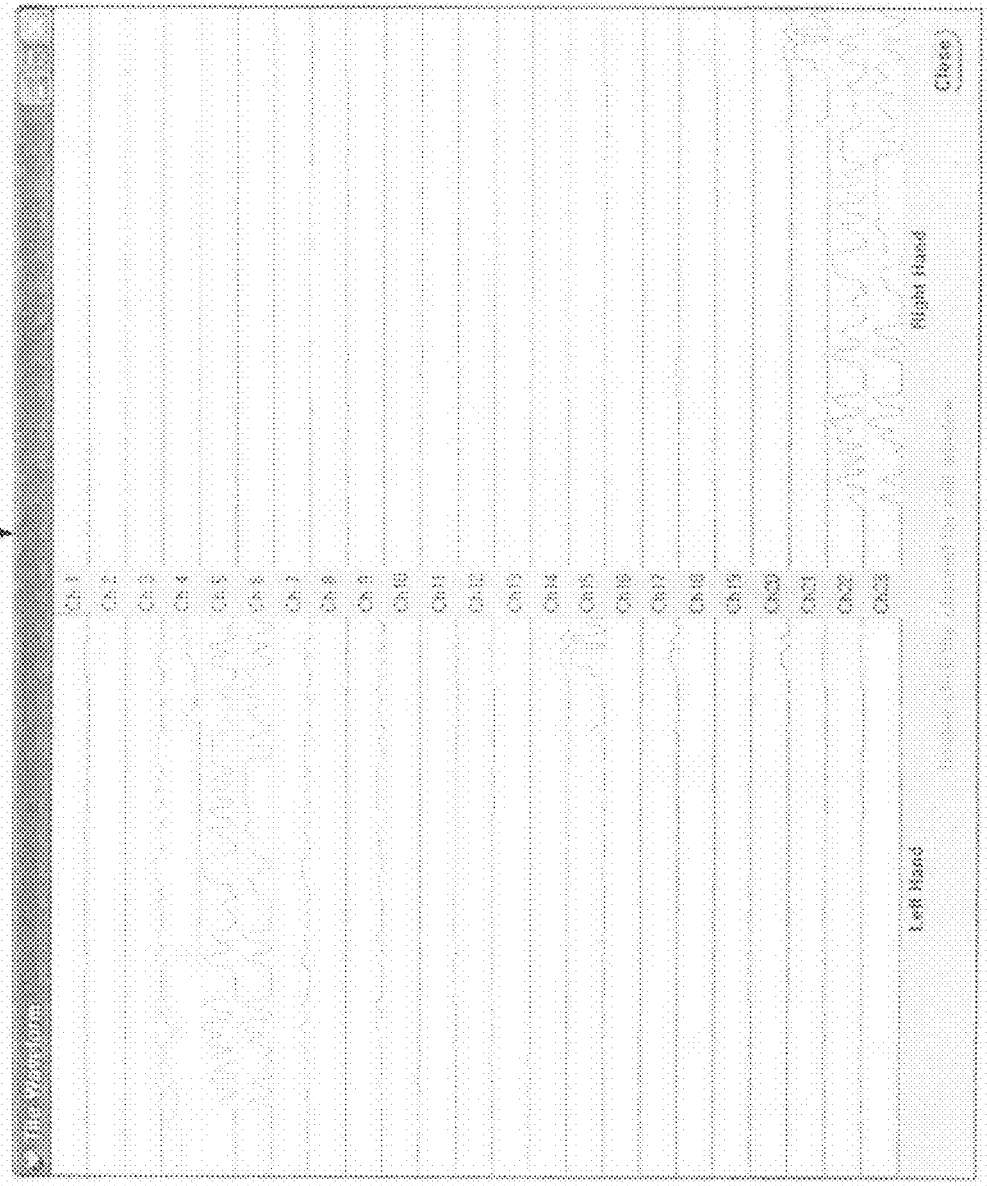
FIG. 14 shows a tile waveform window.

FIG. 14 shows a tile waveform window showing the operation state of each sensor.

The window 140 makes the operator check whether the sensors are normally operated by showing the data of each sensor in one screen. The computer forms a waveform based on time by parsing the Newton data loaded on the volatile memory according to channel. Herein, the computer forms the window 140 shown in FIG. 14 by outputting the waveforms according to channel.

In FIG. 14, the window 140 is formed to output data of sensors mounted on the left and right hands in the form of waveform in the left and right parts of the window based on the y axis of the channel. Also, FIG. 14 presents an example where 23 sensors are set up in each of the left and right parts, respectively.

Figure 15:
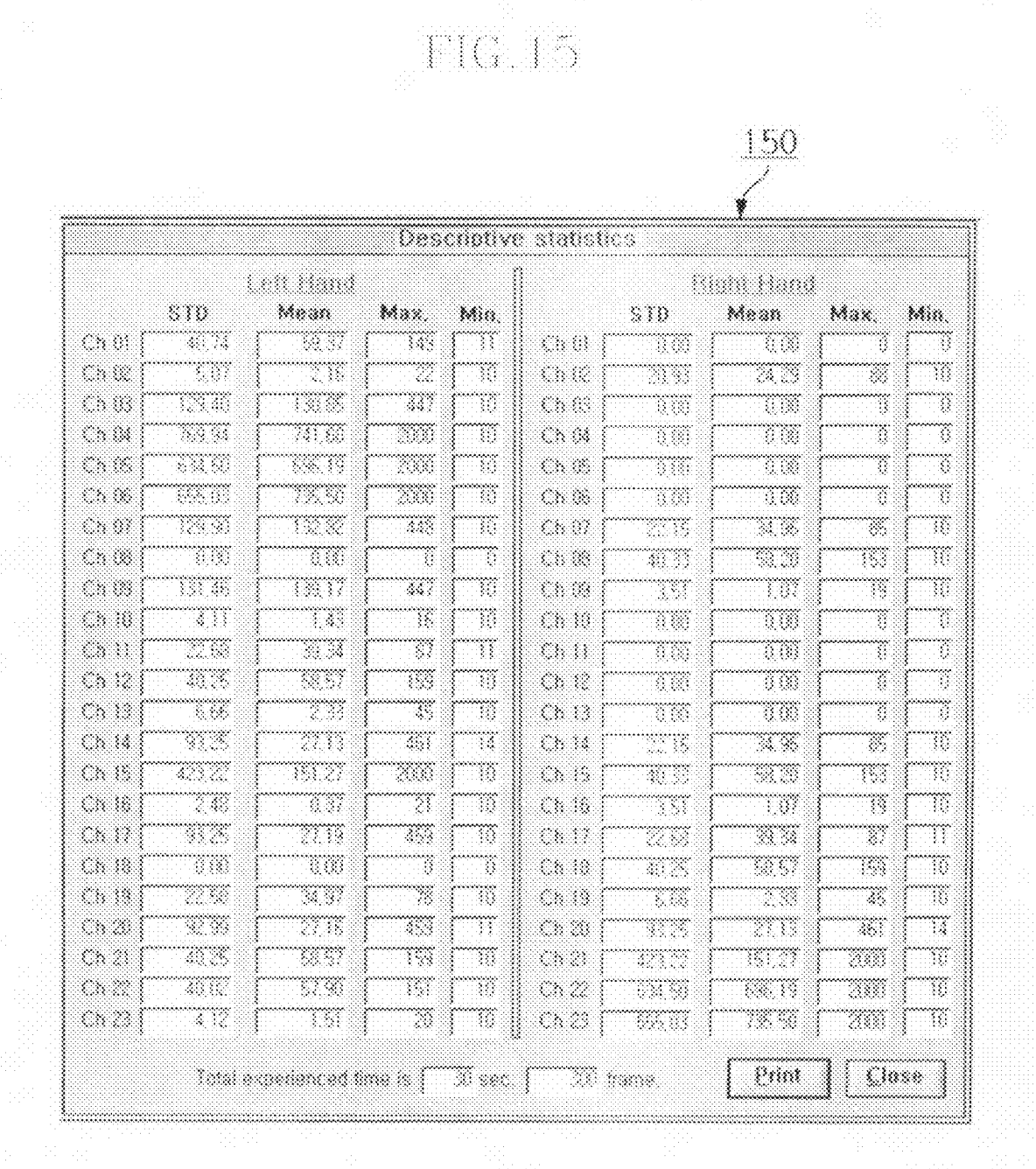

FIG. 15 presents an exemplary window showing variation in a force statistically. Since the window 150 shows the minimum value, the maximum value, the mean value, and the standard deviation of the magnitude of force based on time in each of the sensors, which are set up in the left and right parts of a screen, it is quite useful for statistical analysis.

The computer parses the Newton data loaded on the volatile memory according to channel, calculates the mean value, the standard deviation value, the maximum value, and the minimum value of the force in each channel in a conventional statistic computation method, and forms the window 150 shown in FIG. 15. In FIG. 15, 'MEAN' denotes an average value of force and 'STD' stands for standard deviation, while 'max' and 'min' denote the maximum value and the minimum value, respectively.

Hereinafter, a method for editing Newton data will be described. The editing method is optionally used for the purpose of the operator and it is performed for an individual sensor. When the Newton data are edited, the Newton data forming the windows of FIGS. 11 to 15 are updated with the edited data and updated windows are displayed.

Figure 16:
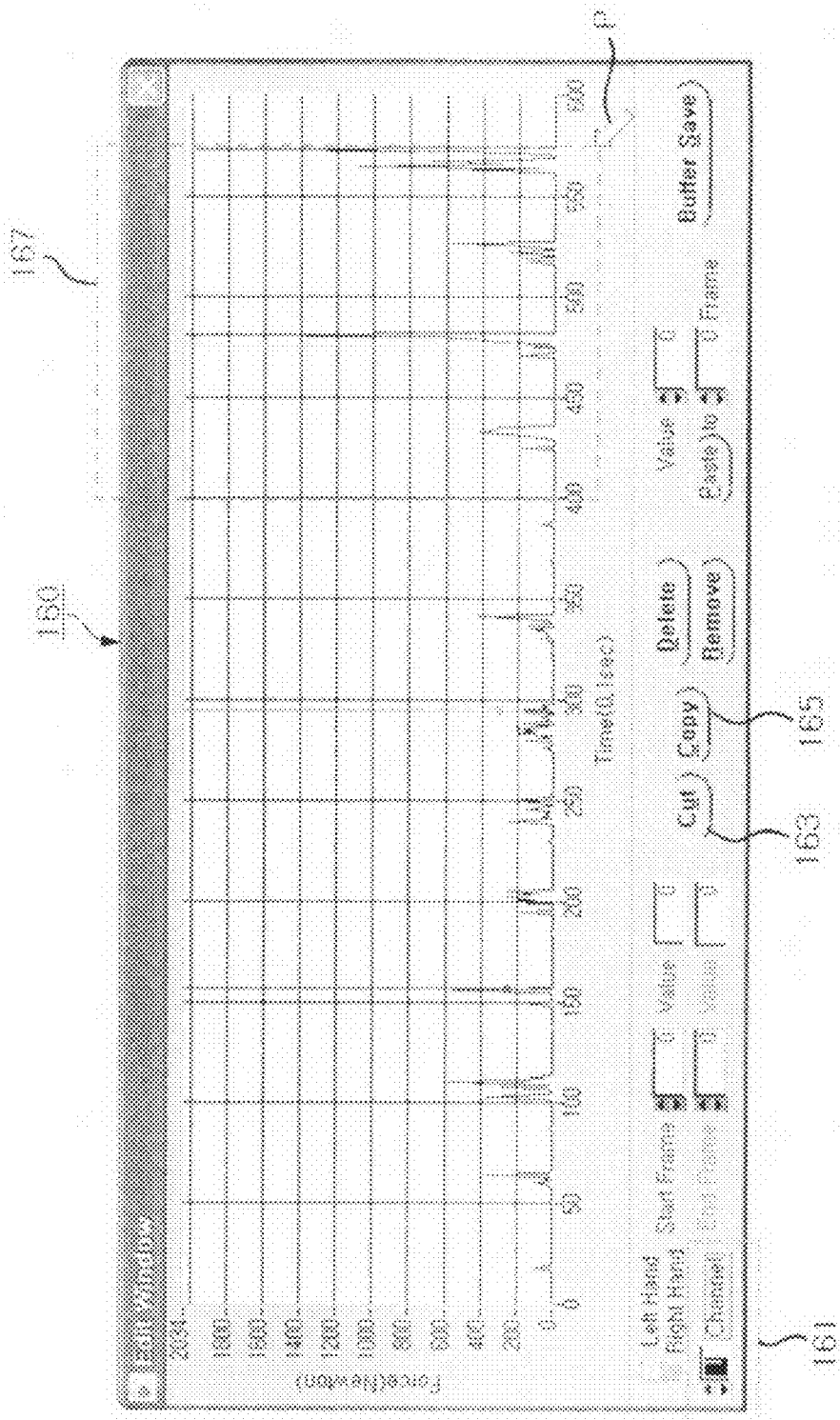
FIG. 16 shows a window for editing data of each sensor.

FIG. 16 shows a window for editing data of each sensor. The editing window 160 includes a graph with the x axis showing time and the y axis showing force. In the graph, the variation in force applied to each sensor is displayed in the form of waveform according to time.

The editing window 160 includes a selection screen 161 for selecting any one of the sensors 11, and a cut button 163 and a copy button 165 for editing data.

The selection screen 161 makes the operator select any one of the sensors 11 mounted on the glove 10, and the cut button 163 and the copy button 165 optionally cuts and copies part of data outputted to the graph.

When the operator selects a sensor whose data need to be edited, which is displayed as a channel in the drawing, by manipulating the selection screen 161, the computer forms waveform by reading the Newton data loaded on the volatile memory and parsing the Newton data based on the sequence of time, and outputs the waveform to the editing window 160.

The operator can remove or copy part of the data registered in the graph by selecting dotted line part 167 of the drawing, which is intended to be edited by dragging a point (P), or selecting the cut button 163 and the copy button 165.

The computer checks out the region defined by dragging the point (P), and deletes part of data identified by a channel among the Newton data upon receipt of a command from a selected button or copies the part of data and registers them in the volatile memory in another name.

Figure 17:
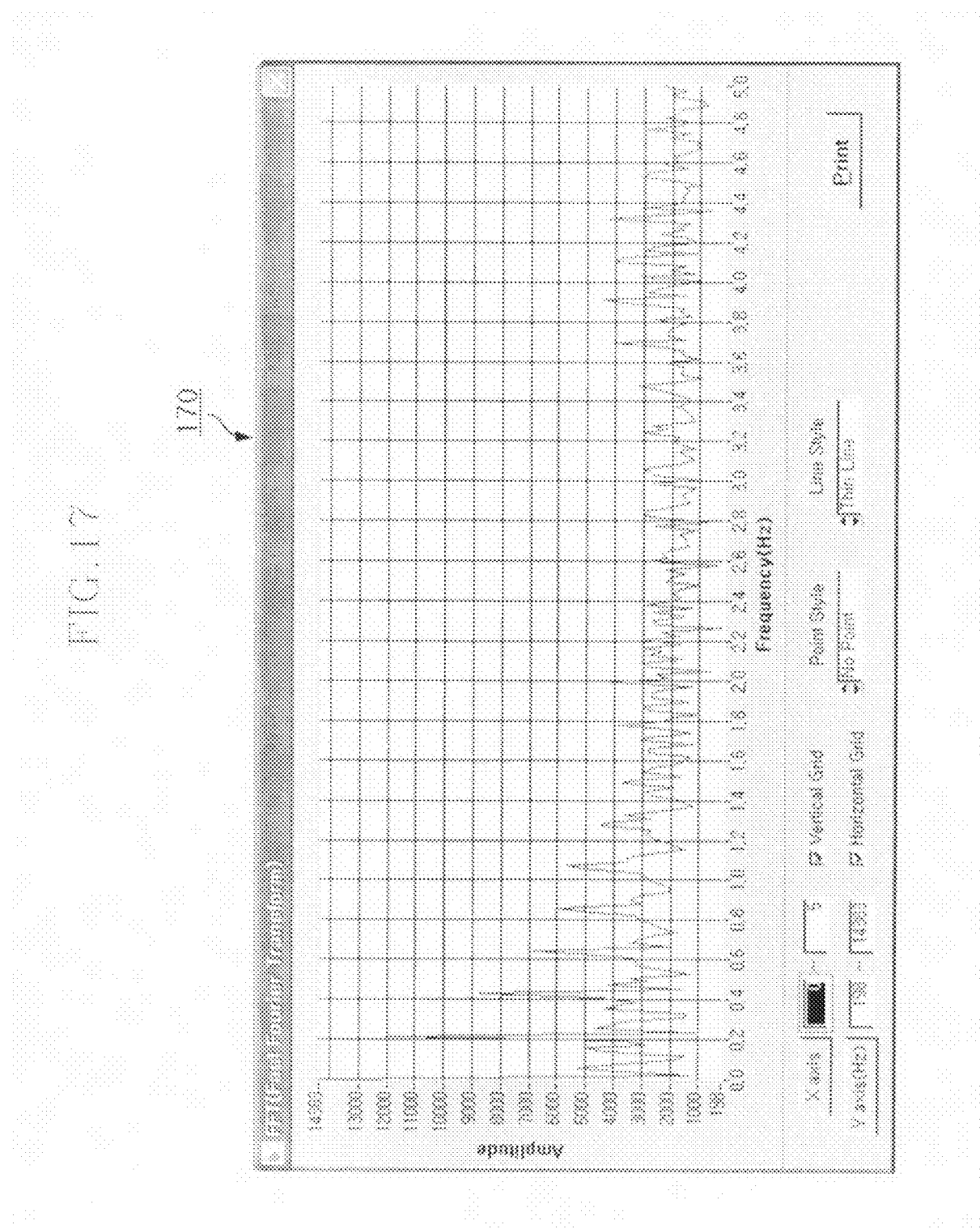
FIG. 17 shows a window for smoothing noise in the records.

FIG. 17 shows a window for smoothing noise when part of the data of each sensor includes the noise; and The smoothing window 170 includes a graph with the x axis showing time and the y axis showing force. In the graph, variation in force of each sensor is shown in the form of waveform according to time.

Figure 18:
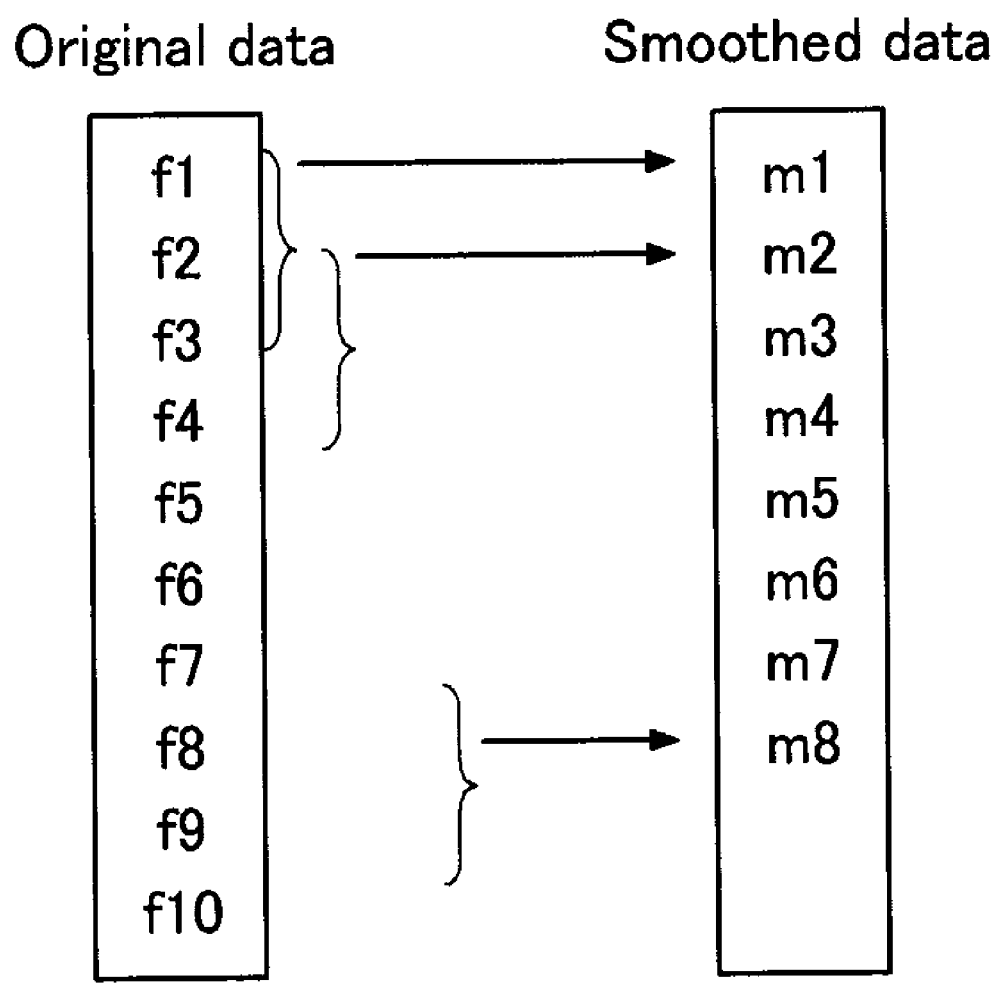
FIG. 18 describes a smoothing process in accordance with an embodiment of the present invention.

The computer smoothes the noise included in the data by applying a moving average to reduce data distortion by noise. As illustrated in FIG. 18, the moving average is obtained by acquiring the first data m1 which are smoothed by the mean of the initial consecutive three original data f1, f2 and f3 and then acquiring the second data m2 smoothed by the mean of the three consecutive data f2, f3 and f4 from the second data f2. The final original data f10 are smoothed by repeating the process.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

According to the present invention, the above-mentioned problems can be solved and workers working in the field can continue to work while wearing the measuring apparatus. In short, the measuring apparatus of the present invention can easily collect data on force applied by the hand of the worker in diverse environments. Also, since the sensors of the glove are set up in location where an object directly contacts the human hand, it is possible to collect precise data.

Since the measurement data are stored in the memory in the form of a binary file, it is convenient to read them out of an ordinary computer including a reader device. Since the measurement data can be transferred to the ordinary computer and easily analyzed by a program, it is easy to analyze how much stress the worker feels in what environment.

What is claimed is:

1. A computation apparatus, comprising:
a processor; and
a memory,
wherein the processor converts measurement values of original data which are the measurement values registered in connection with time and channel into force values of a Newton unit and converts the original data into Newton data by using a computation method of a program stored in the memory based on an equation expressed as:

$$Y = a \times X$$

where X denotes measurement value and a denotes a proportional constant defined as a ratio between a magnitude of known force and measurement value of the known force.

2. The computation apparatus of claim 1, wherein the processor outputs a window displaying a left hand, a right hand, and horizontal bars shown on the hands.

3. The computation apparatus of claim 2, wherein the processor parses the Newton data according to sequence of time, identifies each horizontal bar with the channel of the Newton data, and highlights the force value in the form of a bar.

4. The computation apparatus of claim 3, wherein the processor makes the size of a highlighted bar differ according to the force value.

5. The computation apparatus of claim 1, wherein the processor parses the Newton data, and forms and outputs histogram with the x axis showing force divided into sections for each force magnitude and the y axis showing a ratio (%).

6. The computation apparatus of claim 1, wherein the processor parses the Newton data, and forms and outputs a waveform with the x axis showing time and the y axis showing force.

7. The computation apparatus of claim 6, wherein the processor forms two channel-based force values of the Newton data into waveforms, overlays the two waveforms, and outputs an overlay waveform window.

8. The computation apparatus of claim 1, wherein the processor parses the Newton data, forms a time-based force value into a waveform for each channel, and outputs the waveform of each channel.

9. The computation apparatus of claim 1, wherein the processor parses the Newton data and calculates a mean value, a standard deviation value, a minimum value, and a maximum value of the force value for each channel.

10. The computation apparatus of claim 1, wherein the processor parses the Newton data, forms the force value according to time in the form of a waveform of each channel, and outputs a channel-based waveform window; and
the processor deletes a dragged region of the waveform outputted onto the window from the Newton data or updates the Newton data with the Newton data of the dragged region.

11. The computation apparatus of claim 1, wherein the processor smoothes the force value based on an equation expressed as:

$$Y(n) = \{f(n) + f(n+1) + f(n+2)\}/3$$

where f(n) denotes an $n^{th}$ converted measurement value and n is a natural number.

12. The analysis system of claim 1, wherein the processor parses the Newton data and calculates a mean value, a standard deviation value, a minimum value, and a maximum value of the force value for each channel.

13. An analysis system, comprising:
a measuring apparatus which includes a glove with a plurality of sensors on the palm side, a case with a band for fixing the case to an arm of a user, and a register for registering measurement signals, which will be referred to as measurement value hereinafter, obtained in the sensors, relating the measurement values with time and channel for identifying each sensor, and registering the measurement signals in connection with time and channel as original data, the register being mounted in the case; and a computation apparatus which includes a processor and a memory, where the processor converts the measurement values of the original data into force values of a Newton unit and converts the original data into Newton data by using a computation method of a program stored in the memory based on an equation expressed as:

$$Y=\alpha \times X$$

where X denotes measurement value and $\alpha$ denotes a proportional constant defined as a ratio between a magnitude of known force and measurement value of the known force.

14. The analysis system of claim 13, wherein the processor outputs a window displaying a left hand, a right hand, and horizontal bars shown on the hands.

15. The analysis system of claim 14, wherein the processor parses the Newton data according to sequence of time, identifies each horizontal bar with the channel of the Newton data, and highlights the force value in the form of a bar.

16. The analysis system of claim 15, wherein the processor makes the size of a highlighted bar differ according to the force value.

17. The analysis system of claim 13, wherein the processor parses the Newton data, and forms and outputs histogram with the x axis showing force divided into sections for each force magnitude and the y axis showing a ratio (%).

18. The analysis system of claim 13, wherein the processor parses the Newton data, and forms and outputs a waveform with the x axis showing time and the y axis showing force.

19. The analysis system of claim 18, wherein the processor forms two channel-based force values of the Newton data into waveforms, overlays the two waveforms, and outputs an overlay waveform window.

20. The analysis system of claim 13, wherein the processor parses the Newton data, forms a time-based force value into a waveform for each channel, and outputs the waveform of each channel.

21. The analysis system of claim 13, wherein the processor parses the Newton data, forms the force value according to time in the form of a waveform of each channel, and outputs a channel-based waveform window; and the processor deletes a dragged region of the waveform outputted onto the window from the Newton data or updates the Newton data with the Newton data of the dragged region.

22. The analysis system of claim 13, wherein the processor smoothes the force value based on an equation expressed as:

$$Y(n)=\{f(n)+f(n+1)+f(n+2)\}/3$$

where $f(n)$ denotes an $n^{th}$ converted measurement value and n is a natural number.

* * * * *